(No Model.) 2 Sheets—Sheet 2.
F. B. PEASE.
FRUIT OR VEGETABLE SORTING MACHINE.
No. 497,599. Patented May 16, 1893.
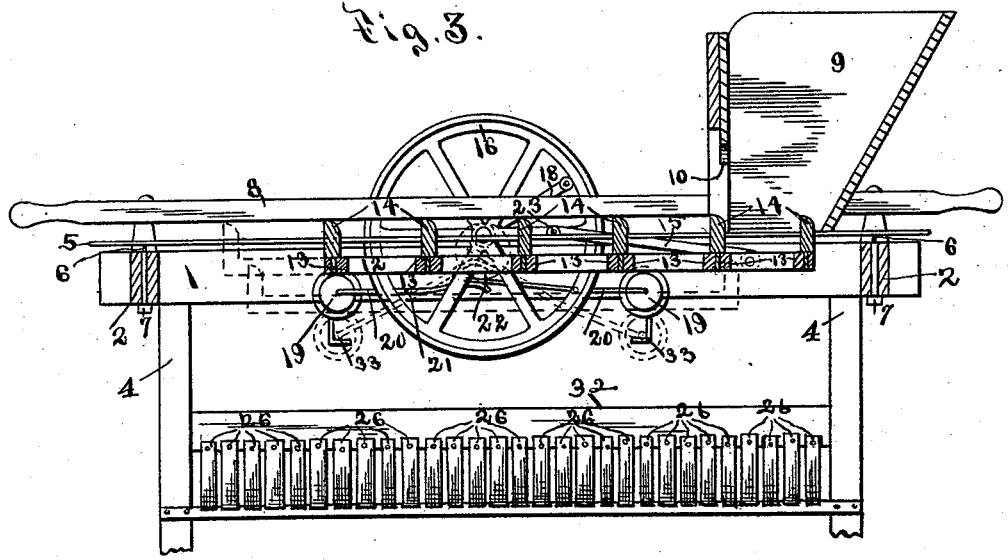
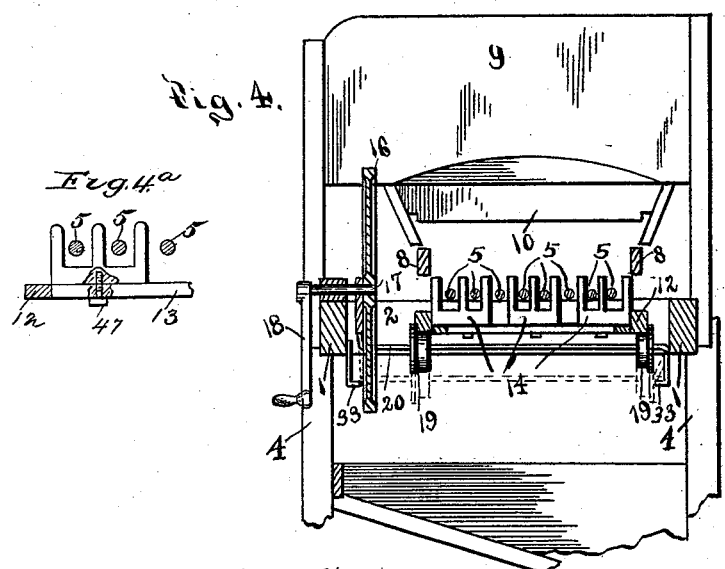
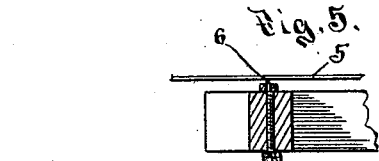
Witnesses:
H. E. Bates
Thomas Durant
Inventor.
Franklin B. Pease
By Churchill
his Att'ys.

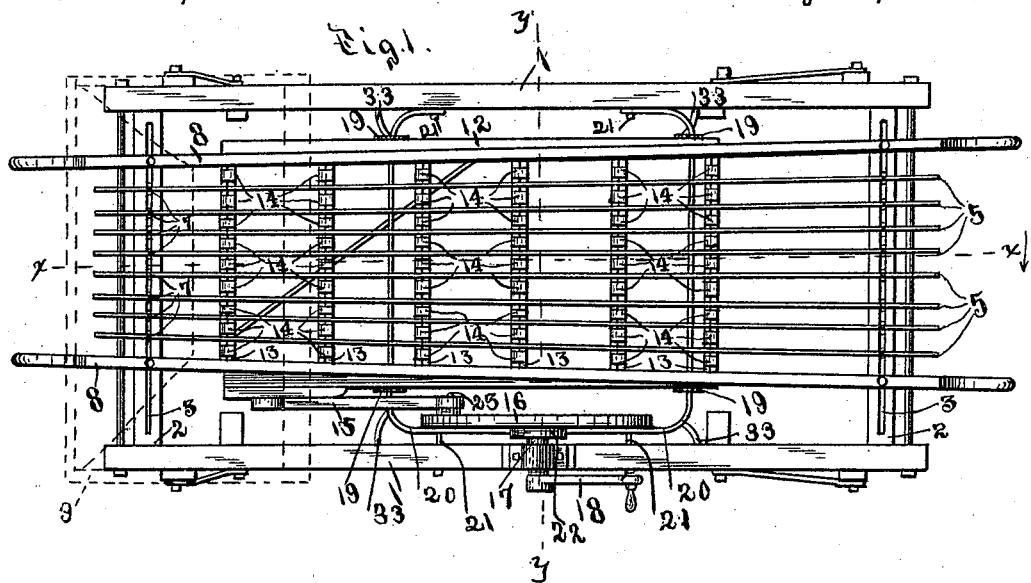

UNITED STATES PATENT OFFICE.

FRANKLIN B. PEASE, OF ROCHESTER, NEW YORK.

FRUIT OR VEGETABLE SORTING MACHINE.

SPECIFICATION forming part of Letters Patent No. 497,599, dated May 16, 1893.

Application filed November 4, 1892. Serial No. 451,018. (No model.)

*To all whom it may concern:*

Be it known that I, FRANKLIN B. PEASE, of Rochester, in the county of Monroe and State of New York, have invented certain new and useful Improvements in Fruit or Vegetable Sorting Machines; and I do hereby declare the following to be a full, clear, and exact description of the same, reference being had to the accompanying drawings, forming a part of this specification, and to the reference-numerals marked thereon.

My present invention has for its objects to provide a machine for sorting fruit, vegetables, or any similar materials, that shall be cheap, simple in construction and certain in operation, and to these ends consists in certain improvements in construction and combinations of parts, all as will be hereinafter fully described and the novel features pointed out particularly in the claims at the end of this specification.

In the drawings: Figure 1 is a plan view of a machine constructed in accordance with my invention; Fig. 2 a side elevation with a portion of the frame broken away; Fig. 3 a longitudinal sectional view, on the line $x$—$x$ of Fig. 1; Fig. 4 a cross-sectional view, on the line $y$—$y$ of Fig. 1. Fig. 4$^a$ is an enlarged detail of the carrying-finger securing-device; Fig. 5 a detail sectional view of one of the fruit supporting bars. Fig. 6 is a view of a modification.

Similar reference numerals in the several figures indicate similar parts.

The main frame or support of the machine embodies the side pieces 1, 1, the end pieces 2, 2, provided with the slots 3, 3, and the supporting legs 4, 4.

5, 5, indicate fruit supporting strips preferably composed of metal rods having bolts or threaded stems 6, connected to their ends, which bolts pass through the slots 3, 3, in the end pieces 2, 2, of the frame and are provided with nuts 7, 7, arranged above and below the pieces 2, thereby providing means for securing and adjusting said rods vertically and laterally relative to each other, but in normal position they are arranged separated at one end more than the other, forming a series of spaces gradually increasing in width from one end of the frame to the other. These rods form a support for the fruit, or other material, to be separated, and at their sides are arranged guide boards 8, 8, adjustably secured to the cross pieces 2, 2, by bolts, said side boards being adjusted when the rods are adjusted so as to guide the fruit properly, as will be understood. Resting on the side pieces 1, 1, is a hopper 9 for containing the fruit extending across the supporting rods 5 at the end where they are closest together, as shown in Fig. 1 in dotted lines and in Figs. 2, 3 and 4 in full lines, a suitable adjustable gate 10 being provided for said hopper as will be understood.

Beneath the fruit support is a reciprocating frame 12 having a series of slotted cross bars 13 to which are attached blocks laterally adjustable on the cross bars and having carrying fingers 14 adapted to project up between the rods of the fruit support when moving away from the hopper and carry the fruit thereon toward the discharge end of the machine and to return to first position below the support and out of contact therewith; this reciprocating motion being caused by a pitman 15 connected to the frame and to a wheel 16 on a shaft 17 and rotated by a crank 18. Though the fingers 14 are adjustable on the bars 13 in a series of three, secured in position by headed bolts 47 passing through the slots in bars 13, single fingers could be employed otherwise secured, without departing from my invention, as will be obvious to those skilled in the art. The frame 12 is supported upon flanged rollers 19 arranged on vibrating frames or bails 20, extending beneath it, near opposite ends, and pivoted to the side pieces of the main frame at 21, the ends of said bails 20 on one side of the machine being extended toward each other so as to lap as in Figs. 2 and 3, the upper extension, and through this the lower, being operated upon by a cam 22 on the shaft 17. The cam and the wrist pin 23 to which the pitman 15 is connected are so arranged relatively that during the rotation of the balance wheel the extensions of the bails will be depressed and the frame 12 raised, when the latter is at the end of the machine toward the hopper, and while the frame is thus raised, it will be reciprocated on the rollers toward the discharge end and the fruit on the support carried along by the fingers; that portion smaller than the space between the rods will drop through and the larger will be carried along and over the end into a suitable receptacle. The fruit passing through between the rods may drop into suitable receptacles provided beneath, or a slotted deflector 32 may be provided, and the fruit be graded by partitions 26, as shown in Fig. 2, if desired.

The amount of motion given the frame 12 and the distance between the rows of carrying fingers are such that the fruit on the support will be moved along a distance nearly equal to the whole extent of the horizontal movement of the wrist pin 23 at each revolution.

Suitable stops 33 may be provided beneath the frames or bails 20, if desired, to limit the downward motion of the outer ends, but this is not absolutely necessary as the cam is usually made to operate upon them at all times.

It is very desirable that the bars or pieces carrying the fingers moving the fruit on the supporting strips 5 be so arranged that the fruit can drop between the latter and instead of employing cross bars 13 on the frame 12, bars or rods 35 could be used extending longitudinally beneath the supporting strips and having fingers 36 secured to their sides, as shown in Fig 6.

The supporting strips could be adjustable at the discharge end of the machine only, if desired, and by adjustment there the sizes of the fruit permitted to drop through may be changed.

It will be understood that various sizes of fruit, or other material, can be sorted by adjusting the bars laterally and also that the means employed for raising and lowering the frame having the carrying fingers can be variously modified, though I prefer the arrangement shown, as it is cheap and admirably adapted for the purpose.

I claim as my invention—

1. In a sorting machine, the combination with the supporting strips, of the reciprocating frame having carrying fingers projecting between the strips, a vertically movable support for the frame and means for reciprocating the frame on the support, substantially as described.

2. In a sorting machine, the combination with the supporting strips, of the reciprocating frame having carrying fingers projecting between the strips, a vertically movable support for the frame, a wheel having a cam for operating the movable support and a pitman connected to the frame and wheel, substantially as described.

3. In a sorting machine, the combination with the main frame and the series of stationary supporting strips thereon relatively adjustable laterally, of the reciprocatory frame arranged beneath the strips having the fingers projecting between them, the vertically movable support on which said frame reciprocates, and means, substantially as described, for raising the support and reciprocating the frame.

4. In a sorting machine, the combination with the stationary frame having the slotted end piece, the supporting strips having the bolts passing through the slot and the nuts on said bolts, of the reciprocatory and vertically movable frame having the laterally adjustable fingers adapted to project between the strips and move the fruit when operated, substantially as described.

5. In a sorting machine, the combination with the supporting strips, of the reciprocating frame having the carrying fingers projecting between the strips, the two frames or bails pivoted on the main frame supporting the reciprocating frame, the wheel having the cam and the pitman connecting the frame and wheel, substantially as described.

6. The combination with the supporting strips, of the reciprocatory frame having the carrying fingers projecting between the strips, the two frames or bails pivoted on the main frame and having the flanged rollers thereon supporting the reciprocatory frame, and means, substantially as described for moving the frame and tilting the bails.

7. The combination with the main frame, the laterally adjustable supporting strips, the adjustable guiding boards, and the hopper, of the two frames or bails pivoted on the main frame, the reciprocating frame thereon having the adjustable fingers, the wheel having the cam operating on the pivoted bails, and the pitman connecting the frame and wheel, substantially as described.

FRANKLIN B. PEASE.

Witnesses:
FRED F. CHURCH,
G. A. RODO.